Patented Aug. 31, 1926.

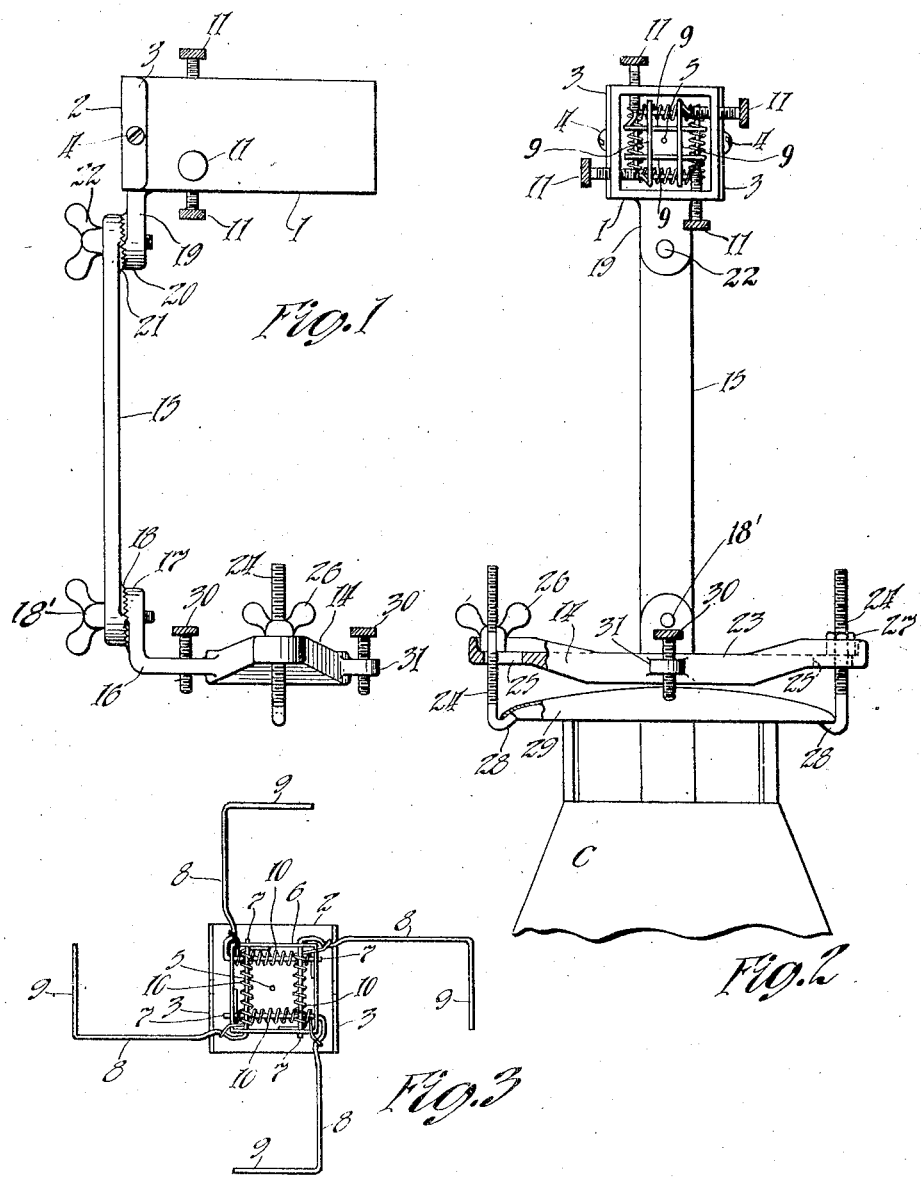

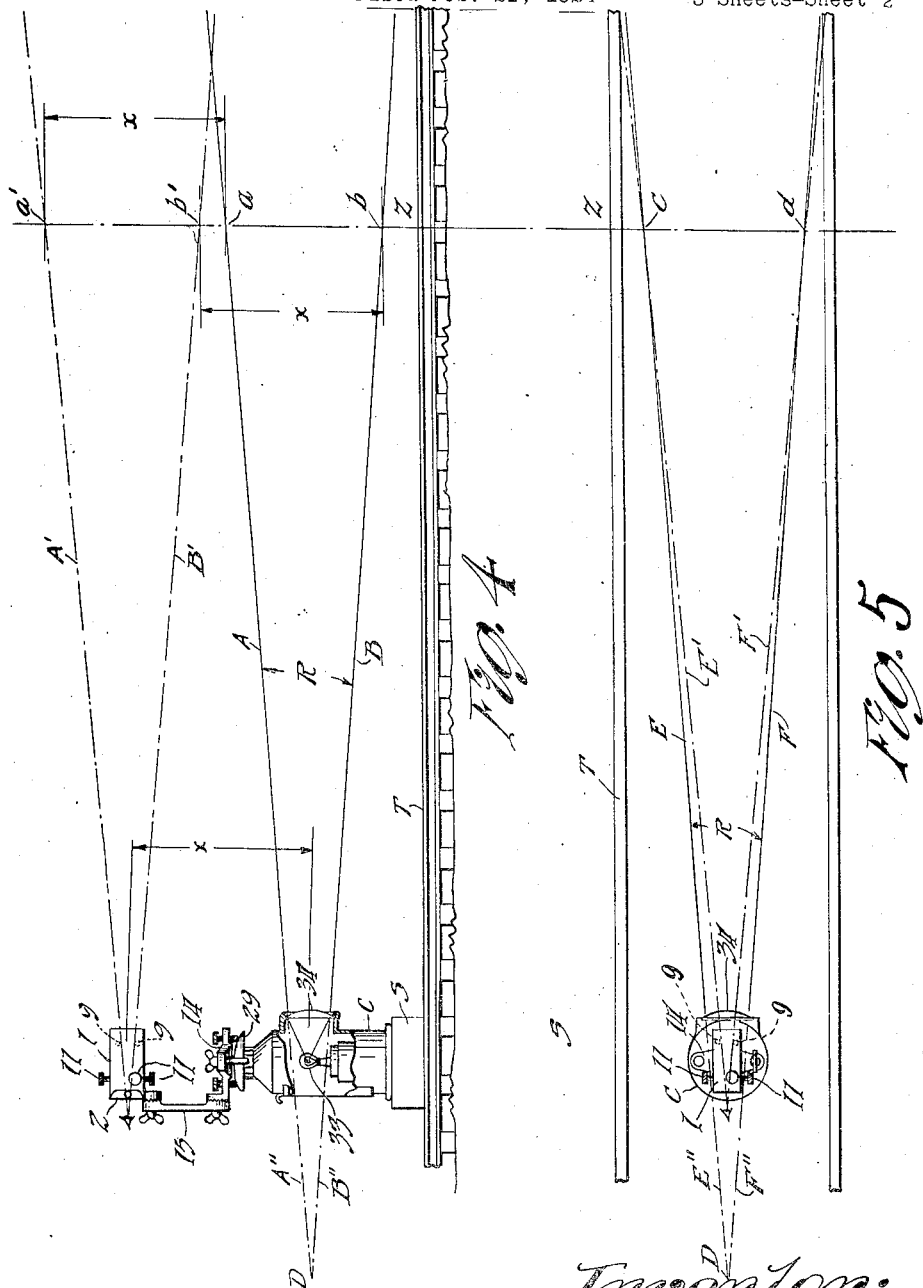

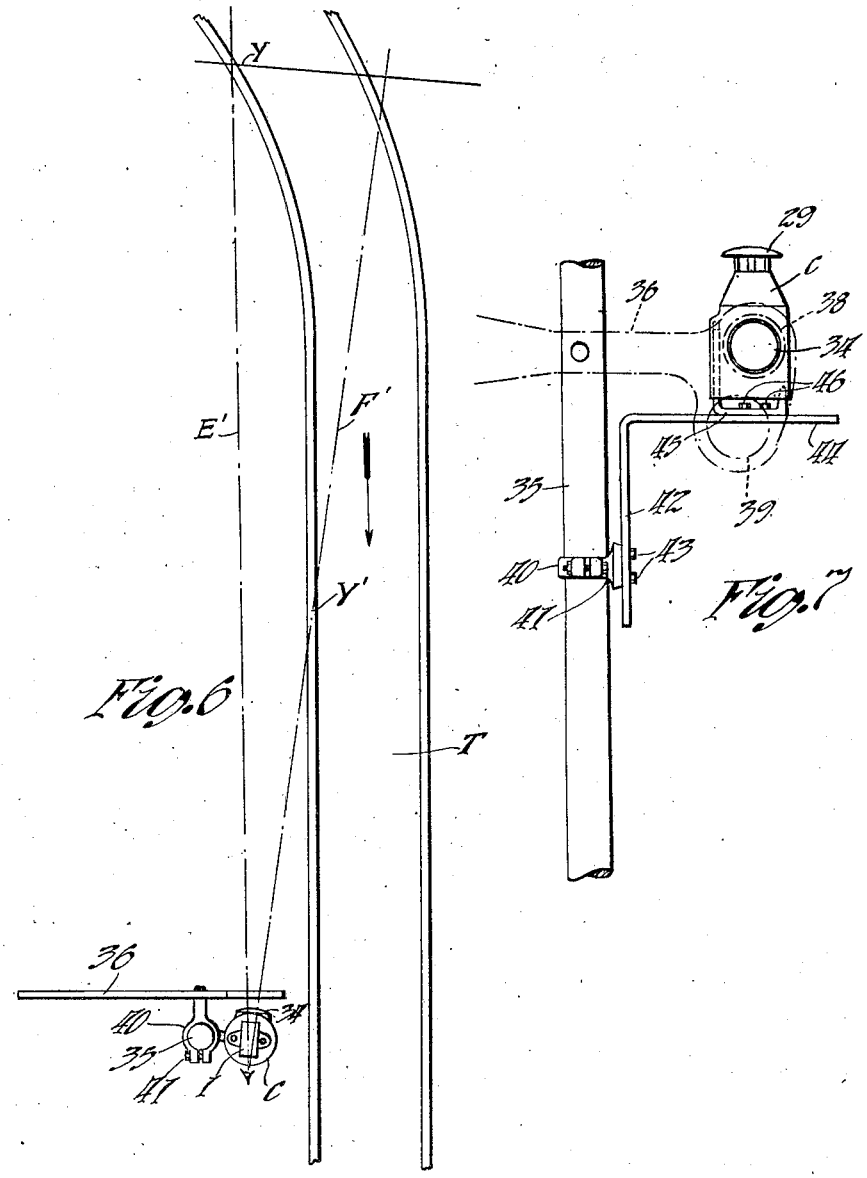

1,598,280

UNITED STATES PATENT OFFICE.

SAMUEL P. HULL, OF YONKERS, NEW YORK, ASSIGNOR TO THOMAS A. EDISON, INCORPORATED, OF WEST ORANGE, NEW JERSEY, A CORPORATION OF NEW JERSEY.

POSITIONING OF LAMPS.

Application filed February 21, 1924. Serial No. 694,224.

My invention relates to the positioning of lamps and more particularly to an improved means and method for enabling a lamp, especially any lamp which throws a concentrated beam such as an automobile or locomotive head light or a railway signal lamp or lantern, to be properly located or positioned on its support so that a desired distant point or area will be illuminated by the light from the lamp, preferably by the dense portion of the projected beam, whereby anyone located at said distant point or within said area will recive a full bright light indication.

While my invention is specifically described herein as applied to railway signalling and lends itself admirably to such application, it is equally well adapted for other uses. In railway signalling, the methods and means heretofore employed for positioning the signal lamps or lanterns on the signal posts or other supports therefor are more or less unsatisfactory, being often inaccurate and unreliable. In some cases a telescope provided with cross-hairs is employed, such telescope being attached to the casing of the lamp to be positioned and the latter adjusted on the signal post to a position in which the projection of the point of intersection of the cross-hairs of said telescope coincides with the point down the track at which the engineer is supposed to get his light indication, the lamp being then rigidly secured to the signal post or support in such position. With this arrangement, in order to obtain the desired result, it is essential that the telescope be secured to the lamp casing in such a position that its axis will be parallel or substantially parallel to the axis of the lens of the lamp, or, in other words, to the center of the beam thrown by the lamp. The attachment of the telescope to the lamp in this position, however, can rarely be accomplished with accuracy, and moreover in case the lens for projecting the beam of light becomes displaced from the position it is supposed to occupy with reference to the lamp, because of the deformation of the sheet metal lamp housing or of the inaccurate securing of the lens in its seat on such housing, the axis of the telescope may be so far from being parallel to the axis of such lens that when the lamp or lantern is adjusted on the signal post by use of the telescope in the manner described above, the point down the track at which the engineer is supposed to get his light indication and with reference to which the lamp and attached telescope were adjusted on the signal post, will not even be within the limits of the beam of light thrown from the lamp. Such a condition, of course, would be extremely dangerous due to the possibility of the train operator not receiving the proper signal or light indication. It has also heretofore been common in positioning a railway signal lamp or lantern on its signal post, for one man to adjust the lantern on the post, in accordance with signals given by a second man stationed at the distant point down the track at which it is desired that a light indication be received from the lantern, to a position in which the second man receives such light indication, the man on the signal post then rigidly securing the lantern to the post in such position. When this method is followed, however, a clear and effective light indication may be received only at a single distant point on the track, it being only a matter of chance if the engineer of an approaching train receives an effective light indication over any considerable portion of the approach view.

One of the objects of my invention is to render it possible to readily and correctly position a signal lamp or lantern on a signal post or other support, so that the engineer of an approaching train will receive an efficient light indication at the desired point on the track and will continue to receive such indication during the greatest possible portion of the approach view.

Further objects of my invention are to provide an improved means and an improved method whereby any lamp throwing a concentrated beam of light may be effectively and accurately adjusted by making use of certain limits of the beam, preferably the outside limits of the intense portion of the beam, instead of the center of the beam as is customary.

My invention also contemplates an improved arrangement comprising the combination of a lamp to be positioned or adjusted as described above and sighting means applied to the lamp to enable the latter to be so positioned or adjusted. In this connection, it is particularly noted that while the sighting means is preferably removably applied to the lamp in order that it may be used for positioning or adjusting other lamps, my invention is of such scope as to include a construction in which the sighting means is permanently applied to the lamp.

In carrying out my invention the sighting means or device to be used in conjunction with a lamp or lantern to be positioned is applied to the casing of the lantern. This sighting means is either so applied to the lamp casing or so adjusted with respect to said casing after being secured thereto, that the field of sight and lines or planes of sight defined thereby will bear certain predetermined relations to the dense portion of the beam of light thrown from the lamp, preferably to outside limits of said dense portion of the beam, whereupon the lamp with the sighting means or device applied thereto is moved to and secured in that position on the support therefor in which the field of sight defined by the sighting device includes that point or area which it is desired to illuminate by the dense portion of the beam from the lamp.

Other objects and features of my invention will be hereinafter more fully described and claimed.

In order that my invention may be more clearly understood, attention is directed to the drawings accompanying and forming part of this specification, which illustrate one application of the invention, viz: to railway signalling, and in which:

Figure 1 is a view in side elevation of an adjustable sighting device in accordance with my invention and the means for securing the same to the casing of a signal lantern:

Fig. 2 is a view in elevation, partly in section, of the sighting device and its supporting means, looking from the right in Fig. 1, shown applied to the housing or casing of a signal lantern;

Fig. 3 is a detailed view in elevation of the removable end wall of the sighting device shown in Figs. 1 and 2, and the spring-pressed sighting members or bars carried thereby;

Fig. 4 is a diagrammatic view in elevation, partly in section, illustrating how certain of the preliminary adjustments of the sighting device are effected;

Fig. 5 is a diagrammatic plan view illustrating the manner in which certain other of the preliminary adjustments of the sighting device are effected;

Fig. 6 is a diagrammatic plan view illustrating the manner in which the signal lantern, and the sighting device attached thereto, are properly positioned on the signal post after the sighting device has been preliminarily adjusted; and Fig. 7 is a fragmentary view in elevation of a signal post and a signal lantern attached thereto by a conventional form of lamp bracket.

Referring to the drawings, and especially to Figs. 1 to 3, the sighting device which I employ in carrying out my invention, preferably comprises a rectangular hollow box 1 open at one end and having a removable wall or closure 2 at its other end, the end wall 2 being provided at two of its opposite sides with flanges 3 which extend over opposite sides of the box 1. Screws 4 extending through the flanges 3 and threaded into the side walls of the box 1 serve to removably secure the end wall in position. The end wall 2 is provided at its cener with a small sight opening or peep-hole 5. On its inner side the wall 2 is formed with an inwardly extending rectangular flange 6, and the legs 7 of four substantially U-shaped rods or wires respectively extend through and are pivoted in opposite sides of this flange, as best shown in Fig. 3. The arrangement is such that the inner pivoted legs 7 and the outer free legs 9 of the adjacent U-shaped rods or wires extend transversely and preferably at right angles to each other. A helical spring 10 surrounds the pivoted leg 7 of each of the U-shaped rods or wires, one end of this spring bearing against the end wall 2 and the other end thereof coacting with the base 8 of the respective rod or wire and tending to maintain the latter in the position shown in Fig. 3. When the end wall 2 is applied to the box 1, the U-shaped rods or wires are collapsed or pressed towards each other against the action of springs 10 until the base portions 8 are substantially parallel to each other, so as to permit the insertion of the U-shaped rods into the box 1. Upon the insertion of the U-shaped rods or wires into the box 1 and the securing of the end wall 2 to the box, as shown in Figs. 1 and 2, the base portions 8 of the rods will extend lengthwise of the box and the outer legs 9 will cross each other to form a rectangle, as shown in Fig. 2. Four screws 11 are respectively threaded through the four side walls of the box 1 and the inner ends thereof respectively bear against the base portions 8 of the U-shaped wires or rods. The outer legs 9 constitute sighting members or bars which cooperate with the peep-hole 5 to define an enclosed rectangular field of sight, each bar or leg 9 cooperating with the peep-hole to define a line or plane of sight. It is apparent that by means of screws 11, the sighting members or bars 9 may be independently adjusted with reference to each other. Consequently, on sighting through the peep-hole 5 and properly adjusting the respective screws 11, the sighting device may be adjusted so as to define a field of sight including any desired distant area.

The means for securing the sighting device to the casing of a signal lamp or lantern comprises a member 14 in the form of a bracket or elongated bar having a central offset portion 23, and an arm 15 adjustably and pivotally connected at one end with the bar 14 and at the other end with the box 1 of the sighting device. The bar 14 is provided at one side intermediate its ends with a lateral angular extension 16 having an upstanding circular shaped end portion 17. The lower end of the arm 15 is also provided with a circular shaped portion 18, and a screw 18′ having a winged head extends through the portions 17 and 18 and serves to pivotally and adjustably connect the arm 15 and bar 14. The box 1 is provided with a depending arm or bracket 19 having a circular shaped end portion 20, and the upper end of arm 15 is provided with a corresponding circular shaped portion 21, a screw 22 having a winged head and extending through the portions 20 and 21 serving to adjustably and pivotally connect the box 1 and arm 15. The adjacent faces of the respective coacting portions 17 and 18, and 20 and 21 are serrated, as shown, so that the bar 14 and arm 15 and the box 1 and arm 15 may be rigidly secured together in any desired positions of adjustment about the axes of their pivotal connections. The axes of the pivotal connections between the box 14 and arm 15 and the box 1 and arm 15 are preferably substantially parallel and also preferably substantially parallel to the axis of the box 1 of the sighting device. The bar 14, however, preferably extends at right angles to the axis of the said pivotal connections and box, and the central offset portion 23 thereof is adapted to be spaced slightly above the top 29 of the casing of the lamp or lantern C when the device is applied to the latter. The threaded shanks 24 of a pair of clamps respectively extend through slots 25 formed in the end portions of the bar 14, a winged nut 26 being threaded on the shank 24 of one of these clamps and a nut 27 being threaded on the shank 24 of the other clamp. The lower ends of the clamps are formed or provided with hooks 28 adapted to take under the top 29 of the casing of lantern C. Two screws 30 are respectively threaded through the lateral extension 16 of the bar 14 and a lug 31 formed at the opposite side of the bar, these screws preferably being located substantially midway between the ends of the bar 14. The lower ends of the screws 30 are adapted to bear on and coact with the top 29 of the lantern casing.

In utilizing the sighting device described, the same is first applied to a signal lamp C which it is desired to position on a signal post or other support, by rigidly securing the member or bracket 14 to the top 29 of the lamp casing in spaced relation thereto by means of the clamps 24, 24 and screws 30, 30, as shown in Fig. 2. The sighting device is preferably so positioned on the lamp that the longitudinal axis of the box 1, which passes through the peep-hole 5, will be parallel with the axis of the lens 34 of the lamp, and also so that the said axes will be in the same vertical plane and the bottom of the box 1 will be substantially horizontal when the lamp is in an upright position. Such positioning of the sighting device on lamp C may be readily effected by proper adjustment and manipulation of the clamps 24, screws 30, arm 15, box 1 and screws 18′ and 22. The sighting device is then preliminarily adjusted so that the same will define a predetermined field of sight as follows: The lamp or lantern C with the sighting device applied thereto, as described, (referring now to Figs. 4 and 5) is mounted on a suitable low support at any desired location such as at the station or point S on a railroad track T, the lamp 33 of the lantern being lighted and the lens 34 directed to throw a conical beam of light in the direction of the track T. The dense portion R of the beam of light thrown by the lantern C is very intense and the line of demarcation between this dense portion of the beam and the rest of the beam, is so sharp and distinct as to enable anyone located at a distance from the lantern in the path of the light therefrom readily to determine the limits of the said dense portion of the beam, even in daylight. The upper, lower and lateral or side limits of this dense portion of the beam are represented in Figs. 4 and 5 by the lines A, B, E and F respectively. A person at a station or point Z on the track T, preferably distant about 150 feet from S where the lamp or lantern C is located, now gives to an operator at S a suitable indication of the position of a point a′ which is located directly above the point a in the upper limit A of the dense portion R of the beam a distance equal to the distance x between the axis of lens 34 of the lantern C and the axis of the sighting device. This indication may be conveniently given to the operator at S by holding one end of a stretch of cord or piece of white cloth, such as a handkerchief, equal in length to the distance x, at the point a, and the other end thereof directly above the point a. The operator at S then sights through the peephole 5 of the sighting device and adjusts the proper screw 11 until the line or plane of sight A′ defined by said sight hole and the upper sighting member or bar 9 includes the point a′, or the upper end of the said stretch of cord or white cloth, at the distant station Z. The man at Z then gives to the operator at S, in like manner, an indication of the position of a point $b'$ which is located directly above the point $b$ in the lower limit B of the dense portion R of the beam of light from the lantern a distance equal to the said distance $x$; and the operator at S then adjusts the lower sighting member or rod 9 so that the same and the sighting hole 5 will define a line or plane of sight B' which includes the said point $b'$. The man at Z also gives to the operator at S suitable indications of the locations of the points $c$ and $d$ in the side limits E and F of the said dense portion R of the beam of light from lantern C, and the said operator adjusts the two remaining sighting members 9 so that the lines or planes of sight E', F' defined by the latter and the peep-hole 5 will respectively include the points $c$ and $d$. This concludes the preliminary adjusting of the sighting device. The lines of sight A', B', E' and F' thus determined will be approximately parallel to the limit lines A, B, E and F respectively, and as the distance $x$ between the axis of the lens 34 of lamp or lantern C and the axis of the sighting device is small, preferably not more than 16 inches, the field of sight defined by the sighting device will intercept the dense portion R of the beam of light at a point comparatively close to the lantern and will be substantially coextensive with said dense portion of the beam except for a short distance in the throw of the lantern adjacent the latter. The sighting device could be made so that the lines A', B', E' and F' would be exactly parallel to the lines A, B, E and F respectively. This, however, would require a sighting device having a peep-hole, corresponding to the peep-hole of the sighting device shown, located at a point vertically above a point D at the intersection of the rearward extensions A'', B'', E'' and F'' of the lines A, B, E and F respectively representing the upper, lower and side limits of the dense portion R of the beam of light from the lantern, and also a sighting device having a construction permitting the opposed sighting members, corresponding to the sighting members 9 of the device shown herein, to be separated a distance at least equal to the diameter of the lens 34. However, such a sighting device would be bulky and unwieldy, and it is accordingly preferred to employ a sighting device of the construction and arrangement shown as the results obtained thereby are entirely satisfactory for all practical purposes. In this connection it may be noted that when the sighting device shown has been applied to the lantern C and preliminarily adjusted as described, all points within the rectangular field of sight defined by such sighting device at any considerable distance from the lantern, except those points in said field of sight at or closely adjacent the outer limits thereof, will be within the dense portion R of the beam of light thrown from the lantern, and that the central point of said field of sight will be closely adjacent the center of said dense portion of the beam. It will accordingly be apparent that if the lantern and sighting device are now adjusted to a position in which a distant point is included within the field of sight defined by the sighting device, a person located at such distant point will be within the dense portion of the beam thrown from the lantern C and therefore will receive a light indication.

The lamp or lantern C with the sighting device applied thereto and preliminarily adjusted as described, is now mounted on its signal post 35 adjacent the track T in operative relation to the pivotally mounted semaphore signal arm 36 provided with the usual differently colored glasses or lenses 38 and 39, respectively adapted to register with the lens 34 of the lantern as the arm is moved into "caution" and "danger" positions. The means for mounting the lantern on the post 35 comprises a split collar 40 embracing the post and clamped thereon by a bolt 41 extending through the ends of the collar, a large right-angular bracket 42 secured to the collar 40 for adjustment about a horizontal axis by means of screws or bolts 43, and a small right-angular bracket 45 on which the lantern C is directly mounted and which is secured to the horizontal arm 44 of the bracket 42 for adjustment about a vertical axis by means of the screws or bolts 46. Bolts or screws 43 and 46 are loosened and the lantern C and the sighting device applied thereto are then adjusted about the said horizontal and vertical axes to a position in which the field of sight defined by the sighting device includes a distant point along the track T at which it is desired that the engineer of an approaching train will receive a light indication from the lantern C, the screws or bolts 43 and 46 then being tightened to rigidly secure the lantern in this position. The sighting device may then be removed from the lantern and used in the manner described properly to position other lanterns on their posts or supports. Where, however, the lamp or lantern is likely to be removed from its post or support and either mounted on another or other supports therefor or remounted on the same post or support, it is desirable not to remove the sighting device from the lamp and in some cases even to secure the sighting device permanently to the lamp.

Where the place on a track at which it is desired the engineer of an approaching train shall first receive a light indication, is located on a bend or curve of the track, such as the point Y shown in Fig. 6, the lamp or lantern C with the sighting device applied thereto and preliminarily adjusted, is preferably adjusted on post 35 to a position in which the said point Y will be included within the field of sight defined by the sighting device, but at a point in said field adjacent the top edge and one side edge thereof. The engineer of the approaching train will then receive a light indication from the lamp C during the greatest possible portion of the approach of the train toward the signal post 35. This, it is believed, will be clear from Fig. 6 showing the lamp or lantern C, with the sighting device applied thereto, adjusted to a position on the signal post 35 designed to give the engineer of a train approaching the signal post in the direction of the arrow, a light indication during the movement of the train from the point Y approximately to the point Y'. Care should be taken, of course, not to adjust the lamp and the sighting device to such a position on the signal post 35 that the distant point Y will be so close to any limit or edge of the field of sight defined by the sighting device as to be without the dense portion of the beam thrown from the lamp C.

As hereinbefore indicated, my invention is neither limited in its application to signal lamps or lanterns, nor to the particular form of sighting device specifically shown and described herein. With some types of lamps the sighting device used in combination with the lamp may advantageously be permanently secured or applied to the lamp. In some instances, the sighting device may also be applied to the lamp with the peep-hole or like sighting means and the sighting members cooperating therewith, in fixed permanent positions with respect to the lamp, and where this is done the sighting device is preferably so secured to the lamp that the peep-hole and sighting members cooperating therewith will define outer limits of the dense portion of the beam of light thrown from the lamp. My invention is also subject to various other changes and modifications without departure from the spirit thereof or the scope of the appended claims.

Having now described my invention, what I claim as new and desire to protect by Letters Patent is as follows:

1. The combination with a lamp throwing a concentrated beam, of a sighting device associated with said lamp and having a plurality of means for respectively defining a number of limits of said beam, substantially as described.

2. The combination of a lamp throwing a concentrated beam and means associated with said lamp comprising a plurality of adjustable sighting members for defining outside limits of said beam, substantially as described.

3. The combination of a lamp throwing a concentrated beam and means associated with said lamp comprising a plurality of relatively adjustable sighting members for defining limits of said beam which extend in transverse directions, substantially as described.

4. The combination of a lamp throwing a concentrated beam and a sighting device applied to said lamp, said sighting device comprising sighting means and a plurality of sighting members cooperating with said sighting means, said sighting members being adjustable to positions where they coact with said sighting means to define certain limits of said beam, substantially as described.

5. The combination of a lamp throwing a concentrated beam and a sighting device applied to said lamp, said sighting device comprising sighting means and a plurality of sighting members cooperating with said sighting means, said sighting members being adjustable to positions where they coact with said sighting means to define outside limits of said beam, substantially as described.

6. The combination of a lamp throwing a concentrated beam and a sighting device applied to said lamp, said sighting device comprising sighting means and a plurality of sighting members cooperating with said sighting means, said sighting members being adjustable to positions where they coact with said sighting means to define limits of said beam which extend in transverse directions, substantially as described.

7. A sighting device for signal lanterns comprising a member having sighting means and a plurality of sighting members cooperating with said sighting means to define an enclosed field of sight, said sighting members being independently adjustable to vary the extent of such field of sight, substantially as described.

8. A sighting device for signal lanterns comprising a member having sighting means and a plurality of sighting members cooperating with said sighting means to define a substantially rectangular field of sight, said sighting members being independently adjustable to vary the extent of such field of sight, substantially as described.

9. A sighting device for signal lanterns comprising a member provided with sighting means and a plurality of sighting members cooperating with said sighting means to define a field of sight having limits which extend in transverse directions, said sighting members being independently adjustable to vary the extent of such field of sight, substantially as described.

10. A sighting device for signal lanterns comprising a hollow body having a peephole at one end and a pair of sighting members which extend in transverse directions mounted within said body, said sighting members cooperating with said peep-hole to define a field of sight and being independently adjustable to vary the extent of such field of sight, substantially as described.

11. A sighting device for signal lanterns comprising a hollow body having a peep-hole at one end and a pair of sighting members which extend in transverse directions mounted within said body, said sighting members cooperating with said peep-hole to define a field of sight and being independently adjustable to vary the extent of such field of sight, and means for removably attaching said body to a signal lantern with its axis substantially parallel to the axis of the lens of such lantern, substantially as described.

12. A sighting device for signal lanterns comprising a hollow body having a peep-hole at one end and a plurality of relatively and independently adjustable sighting members mounted in said body and cooperating with said peep-hole to define a field of sight, and means for mounting said body on a signal lantern comprising a member provided with means for adjustably and rigidly clamping the same to the casing of a signal lantern, substantially as described.

13. A sighting device for signal lanterns comprising a hollow body having a peep-hole at one end and a plurality of relatively and independently adjustable sighting members mounted in said body and cooperating with said peep-hole to define a field of sight, and means for mounting said body on a signal lantern comprising a member provided with means for adjustably and rigidly clamping the same to the casing of a signal lantern and means for adjustably attaching said body to said member, substantially as described.

14. The combination of a signal lantern, and a sighting device comprising a hollow body having a peep-hole at one end and a plurality of sighting members disposed within said body and cooperating with said peep-hole to define a field of sight, said sighting members crossing each other adjacent the other end of said body and being independently adjustable to vary the extent of such field of sight, said body being secured to the casing of said member with its axis substantially parallel to the axis of the beam of light thrown from the lantern, substantially as described.

15. A sighting device for signal lanterns comprising a hollow body having a peep-hole at one end, a plurality of members within said body pivotally mounted at one end and having end portions extending transversely to each other, said transversely extending end portions cooperating with said peep-hole to define a field of sight, and a plurality of elements having adjustable connection with said body and respectively coacting with said members to effect adjustment thereof, substantially as described.

16. A sighting device for signal lanterns comprising a hollow body having a peep-hole at one end, a plurality of spring-pressed members within said body pivotally mounted at one end and having end portions extending transversely to each other, said transversely extending end portions cooperating with said peep-hole to define a field of sight, and a plurality of elements having adjustable connection with said body and respectively coacting with said spring-pressed members to effect adjustment thereof, substantially as described.

17. A sighting device for signal lanterns comprising a hollow body having a peep-hole at one end, a plurality of U-shaped spring-pressed members within said body, one leg of each of said members having pivotal connection with said body, the other legs of said members extending transversely to each other, said transversely extending legs cooperating with said peep-hole to define a field of sight, and a plurality of elements having adjustable connection with said body and respectively coacting with said members to effect adjustment thereof, substantially as described.

18. A sighting device for signal lanterns comprising a hollow body having a removable end wall provided with a peep-hole, a plurality of members pivotally mounted at one end on said end wall and having end portions extending transversely to each other, said transversely extending end portions cooperating with said peep-hole to define a field of sight, and a plurality of elements having adjustable connection with said body and respectively coacting with said members to effect adjustment thereof, substantially as described.

19. A sighting device for signal lanterns comprising a hollow body having a removable end wall provided with a peep-hole, a plurality of spring-pressed members pivotally mounted at one end on said end wall and having end portions extending transversely to each other, said transversely extending end portions cooperating with said peep-hole to define a field of sight, and a plurality of elements having adjustable connection with said body and respectively coacting with said members to effect adjustment thereof, substantially as described.

20. A sighting device for signal lanterns comprising a hollow body having a removable end wall provided with a peep-hole, a plurality of U-shaped spring-pressed members, one leg of each of said members having pivotal connection with said end wall, the other legs of such members extending transversely to each other, said transversely extending legs cooperating with said peephole to define a field of sight, and a plurality of elements having adjustable connection with said body and respectively coacting with said members to effect adjustment thereof, substantially as described.

21. The combination of a supporting member provided with means for adjustably and rigidly clamping the same to the casing of a signal lantern, an arm having adjustable connection at one end with said member, and a sighting device having adjustable connection with the other end of said arm, substantially as described.

22. The combination of a supporting member provided with means for adjustably and rigidly clamping the same to the casing of a signal lantern, an arm having adjustable pivotal connection at one end with said member, and a sighting device having adjustable pivotal connection with the other end of said arm, the pivotal axes of said connections being substantially parallel, substantially as described.

23. The combination of a supporting member provided with means for adjustably and rigidly clamping the same to the casing of a signal lantern, an arm having adjustable pivotal connection at one end with said member, and a sighting device having adjustable pivotal connection with the other end of said arm, the pivotal axes of said connections being substantially parallel, and means for locking together said supporting member and arm and said sighting device and arm in any desired position of adjustment, substantially as described.

24. The method which consists in associating a sighting device having a plurality of means respectively adapted to define a plurality of lines or planes of sight with a lamp throwing a concentrated beam so that such means respectively define different limits of said beam and then adjusting said lamp and sighting device to a position in which the sighting device defines a desired field of sight, substantially as described.

25. The method which consists in associating a sighting device having a plurality of means respectively adapted to define a plurality of lines or planes of sight with a lamp throwing a concentrated beam so that such means respectively define different outside limits of said beam and then adjusting said lamp and sighting device to a position in which the sighting device defines a desired field of sight, substantially as described.

26. The method which consists in associating a sighting device having a plurality of means respectively adapted to define a plurality of lines or planes of sight with a lamp throwing a concentrated beam so that such means respectively define limits of said beam which extend in transverse directions, and then adjusting said lamp and sighting device to a position in which the sighting device defines a desired field of sight, substantially as described.

27. The method which consists in applying to a lamp throwing a concentrated beam a sighting device comprising means defining a plurality of lines or planes of sight so that said lines or planes of sight will bear a predetermined relation to said beam, and then adjusting said lamp and sighting device to a position in which the latter defines a desired field of sight, substantially as described.

28. The steps in the method of locating a lamp throwing a concentrated beam so that such beam will illuminate a desired area, which consists in associating with said lamp a sighting device comprising a plurality of separately adjustable means for defining a field of sight and then adjusting said means so that said field of sight defined thereby will bear a predetermined relation to said beam, substantially as described.

29. The steps in the method of locating a lamp throwing a concentrated beam so that such beam will illuminate a desired area, which consists in associating with said lamp a sighting device comprising a plurality of separately adjustable means for respectively defining a plurality of lines or planes of sight and then adjusting said means so that said lines or planes of sight will bear a predetermined relation to outside limits of said beam, substantially as described.

30. The method which consists in attaching an adjustable sighting device to a signal lantern, then adjusting said device so that the field of sight defined thereby will bear a predetermined relation to the beam of light thrown from said lantern, applying said lantern with the adjusted sighting device attached thereto, to a signal post or other support, and adjusting said lantern and device on said support to a position in which the sighting device defines a desired field of sight, substantially as described.

31. The steps in the method of locating a signal lantern on its support, which consist in attaching an adjustable sighting device to a signal lantern and then adjusting said device so that the field of sight defined thereby will bear a predetermined relation to the beam of light thrown from said lantern, substantially as described.

32. The steps in the method of properly positioning a signal lantern on its support, which consist in attaching to a signal lantern a sighting device comprising sighting means and adjustable sighting members cooperating with said means to define a plurality of lines of sight, then adjusting said sighting members so that the respective lines of sight defined thereby and by said sighting means will be in a predetermined relation to certain limits of the beam of light thrown from said lantern, substantially as described.

33. The method which consists in attaching to a signal lantern a sighting device comprising a plurality of relatively adjustable sighting members so that the sight through said device will be in the same general direction as the beam of light thrown from said lantern, adjusting said sighting members so that the lines of sight defined by the sighting device will respectively be in a predetermined relation to certain limits of said beam of light, then applying said lantern with the attached sighting device to a signal post or other support, and adjusting said lantern and device on said support to a position in which the field of sight defined by the sighting device includes an area in which it is desired that a light indication be received, substantially as described.

34. The steps in the method of properly positioning a signal lantern on its support, which consist in attaching to a signal lantern a sighting device comprising sighting means and a plurality of adjustable sighting members respectively cooperating with said sighting means to define lines of sight, and then adjusting said sighting members so that the lines of sight defined thereby and by said sighting means will respectively be approximately parallel to certain limits of the beam of light thrown from said lantern, substantially as described.

35. The method which consists in attaching to a signal lantern a sighting device comprising sighting means and a plurality of adjustable sighting members respectively cooperating with said sighting means to define lines of sight, adjusting said sighting members so that the lines of sight defined thereby and by said sighting means will respectively be approximately parallel to certain limits of the dense portion of the beam of light thrown from said lantern, then applying said lantern with the attached sighting device to a signal post or other support, and adjusting the same on the support to a position in which the field of sight defined by the sighting device will substantially correspond to an area in which it is desired that a light indication be received, substantially as described.

This specification signed this 31st day of January, 1924.

SAMUEL P. HULL.